US010808365B2

(12) United States Patent
McCartney

(10) Patent No.: US 10,808,365 B2
(45) Date of Patent: Oct. 20, 2020

(54) METHOD OF PRODUCING A ROAD MAKING MATERIAL AND TO A ROAD MADE THEREFROM

(71) Applicants: Toby McCartney, Lockerbie (GB); MACREBUR LIMITED, Dumfriesshire (GB)

(72) Inventor: Toby McCartney, Lockerbie (GB)

(73) Assignee: Macrebur Limited, Dumfriesshire (GB)

( * ) Notice: Subject to any disclaimer, the term of this patent is extended or adjusted under 35 U.S.C. 154(b) by 191 days.

(21) Appl. No.: 16/072,458

(22) PCT Filed: Jan. 24, 2017

(86) PCT No.: PCT/GB2017/050172
§ 371 (c)(1),
(2) Date: Jul. 24, 2018

(87) PCT Pub. No.: WO2017/129962
PCT Pub. Date: Aug. 3, 2017

(65) Prior Publication Data
US 2019/0032284 A1    Jan. 31, 2019

(30) Foreign Application Priority Data
Jan. 25, 2016   (GB) .................................. 1601279.1

(51) Int. Cl.
*E01C 7/26*        (2006.01)
*C08L 95/00*       (2006.01)

(52) U.S. Cl.
CPC .............. *E01C 7/265* (2013.01); *C08L 95/00* (2013.01)

(58) Field of Classification Search
CPC ...... E01C 19/48; E01C 19/238; E01C 19/236; E01C 19/266; E01C 19/255; E01C 19/22; E01C 19/23; E01C 19/31; E01C 19/233; E01C 19/4806; E01C 19/4813; E01C 19/482; E01C 19/488; E01C 19/4866; E01C 7/18; E01C 7/182; E01C 7/185; E01C 7/187; E01C 7/20; E01C 7/22; E01C 7/24; E01C 7/26; E01C 7/262; E01C 7/265; E01C 7/267; E01C 7/30; E01C 7/32; C08L 95/00; C08L 95/005
See application file for complete search history.

(56) References Cited

U.S. PATENT DOCUMENTS

| 3,206,319 | A  | * | 9/1965 | Minnick ................... | E01C 7/18 106/668 |
| --- | --- | --- | --- | --- | --- |
| 3,783,000 | A  | * | 1/1974 | Hayashi ............. | C09D 195/005 427/186 |
| 4,314,921 | A  | * | 2/1982 | Biegenzein ............. | C08L 95/00 106/281.1 |
| 5,436,285 | A  | * | 7/1995 | Causyn ................... | C08L 95/00 521/41 |
| 6,588,974 | B2 | * | 7/2003 | Hildebrand ............. | C08L 95/00 404/31 |
| 2009/0163625 | A1 | * | 6/2009 | Lang ........................ | C08L 95/00 524/68 |
| 2010/0022686 | A1 | * | 1/2010 | Partanen ................. | C04B 20/04 524/2 |
| 2013/0189033 | A1 | * | 7/2013 | Roetsch ............. | B62D 33/0625 404/122 |
| 2015/0152264 | A1 | * | 6/2015 | Wilson ..................... | C08K 3/36 404/72 |

FOREIGN PATENT DOCUMENTS

| DE | 21 46 902 | A1 |   | 3/1973 |   |
| --- | --- | --- | --- | --- | --- |
| DE | 101 47 451 | A1 |   | 4/2003 |   |
| EP | 0121377 | A1 | * | 10/1984 | ............... C08K 3/06 |
| EP | 0670387 | A2 |   | 9/1995 |   |
| GB | 2 400 129 | A |   | 10/2004 |   |

OTHER PUBLICATIONS

Bitumen 80/100 Product Data Sheet, Bitumina Group, Jan. 2013 (Year: 2013).*
Particle Size and Mesh Size Chart, Sigma Aldrich, Mar. 28, 2016. (Year: 2016).*
International Search Report in International Patent Application No. PCT/GB2017/050172 dated Apr. 21, 2017.

* cited by examiner

*Primary Examiner* — Christopher M Rodd
(74) *Attorney, Agent, or Firm* — Greenberg Traurig, LLP; David J. Dykeman; Roman Fayerberg

(57) ABSTRACT

A method of producing a road making material includes the steps of heating plastics and bitumen and mixing 5%-25% by weight of plastics with bitumen. The heated plastics/bitumen mixture is then mixed with aggregate to form a bituminous compound which may then be used to lay a road (pavement) surface. Alternatively, the heated plastics and bitumen is mixed directly with aggregate to form a bituminous compound. The plastics used is, preferably, waste plastics that is collected, cleaned and shredded, or the plastics may be pelletised or in the form of microbeads.

15 Claims, 1 Drawing Sheet

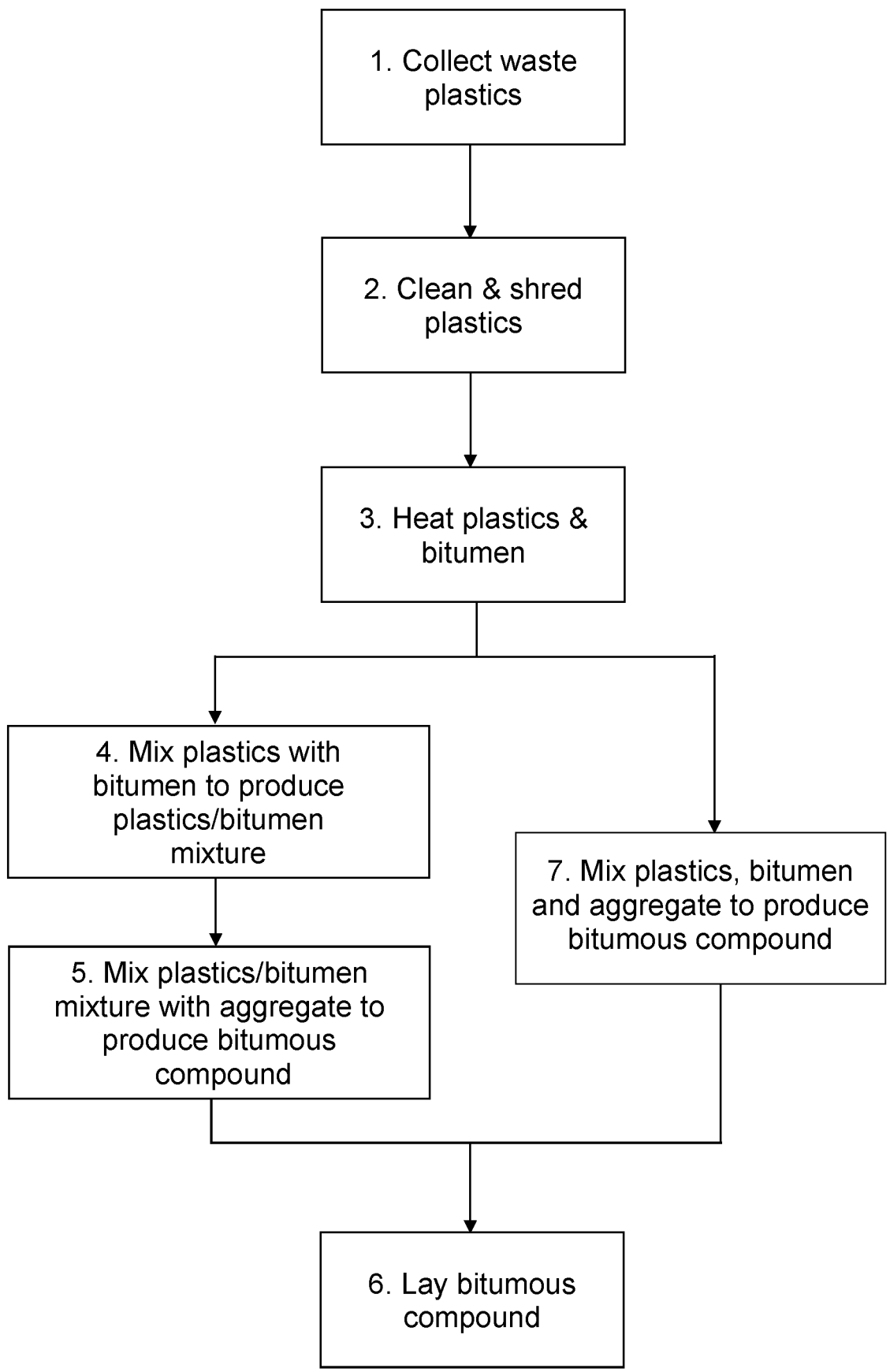

METHOD OF PRODUCING A ROAD MAKING MATERIAL AND TO A ROAD MADE THEREFROM

RELATED APPLICATIONS

This application is a U.S. national phase application of PCT International Patent Application No. PCT/GB2017/050172, filed on Jan. 24, 2017, which claims the benefit of and priority to GB patent application no. 1601279.1, filed Jan. 25, 2016, and both applications are hereby incorporated by reference in their entireties.

This invention relates to a method of producing a road making material and to a road made therefrom. Materials for making roads, sometimes called pavements in some jurisdictions, include stone, aggregate, wood block, vitrified brick and bitumen (sometimes called asphalt). The term "road" used herein includes within its scope pedestrian paths (known as pavements, or sidewalks in some countries) or cycle paths.

Bitumen is a sticky black and highly viscous liquid or semi-solid form of petroleum and may be found in natural deposits or may be refined. The first general use of bitumen in road construction, where it is used as a binder mixed with aggregate particles, was devised by Scotsman John McAdam and the surface became known as "Tarmacadam", abbreviated to "Tarmac" in common parlance.

Mixed-in-place surfacing involves mixing aggregates in a roadway with bitumen in order to obtain a stronger and generally water-repelling surface, with the resultant mixture being compacted. Plant mix surface dressings provide improved strength and waterproofing for higher volumes of automotive traffic and provide an improved riding quality surface. Such a plant mix process generally involves aggregates up to about 3 cm mesh size which is heated to a temperature of 150° C.-250° C. and mixed in a plant with bitumen. The resulting compound is taken to a roadway where it is poured into a laying machine and applied to a road surface, whereupon it is rolled before the mixture cools. Such road surfaces are susceptible to being permeated by rain water and for the surface to break up leaving potholes which are damaging to vehicle tyres, wheels and suspensions, and which can cause severe accidents.

Currently, different grades of bitumen such as 30/40, 60/70 and 80/100 are available in dependence upon the required penetration value, but, for the reason previously stated, there is a demand for an improved road surface.

A different, but worldwide problem, is the disposal of plastics waste. It will be realised that plastics like low density polyethylene is used for bags, sacks, bin liners and squeezable detergent bottles, high density polyethylene is used for bottles for pharmaceuticals, disinfectants, milk and fruit juices, polypropylene is used for bottle caps, film wrapping for food and microwave trays for ready-made meals, polystyrene is used for yoghurt pots and egg packs, foamed polystyrene is used for food trays, egg boxes, and disposable cups, and polyvinylchloride (PVC) is used for mineral bottles, credit cards, toys, electrical fittings, etc. Currently, such plastics materials are used in virtually every sector of the economy from agriculture to packaging, automobile and building construction, and communications equipment. Such plastics material is non-biodegradable and, according to recent studies, can remain unchanged for as long as 4,500 years. At present, the majority of plastics waste is put into landfill, leading to ecological problems.

Currently, a bitumen compound road will last for approximately four to five years, after which it needs to be repaired or replaced on a regular basis, thereby incurring additional cost and inconvenience to road users. Current bitumen compound suffers from temperature effects, oxidation leading to cracking and crazing, the forementioned water problems forming potholes and reducing the life of roads, and relatively high cost in needing to repair or resurface a road on a regular basis.

With regard to plastic waste, attempts at recycling have proved unsuccessful or too expensive and burning the plastics materials has been shown to release gases which are dangerous to the environment.

This invention seeks to utilise waste plastics material, although it is to be understood that the benefit of the method of this invention is not dependent upon such use, since other sources of plastics may be utilised.

Primarily, this invention seeks to produce an improved road making material and an improved road produced therefrom.

According to this invention, in one aspect, there is provided a method of producing a road making material including the steps of:
1. heating plastics and bitumen, and
2. mixing the heated plastics and bitumen with aggregate.

Alternatively, step 2 may include the steps of:
(a) mixing the heated plastics and bitumen to form a plastics/bitumen mixture, and
(b) mixing the mixture of step (a) with aggregate to coat said aggregate with plastics/bitumen.

Preferably, in step 1, the plastics is heated to between 120° C.-180° C.

Advantageously, in step 1, the plastics is heated to approximately 165° C. and the bitumen is heated up to approximately 160° C.

Advantageously, in step 1, the ratio of plastics to bitumen is 5%-25% by weight of plastics to bitumen.

Conveniently, the grade of bitumen is one of 40/60, 60/70, 80/100 or 100/150, but is, preferably, 40/60 for a heavily trafficked road.

Advantageously, the aggregate has a mesh size in the range 1 mm-55 mm and, preferably, has a mesh size of 10 mm or 14 mm.

Advantageously, in step 2 or step (b), the ratio of plastics and bitumen to aggregate is approximately 4%-10% by weight of plastics and bitumen to aggregate.

Preferably, in step 1, waste plastics is collected, cleaned and shredded to 1 mm-50 mm to be heated and mixed with bitumen.

Alternatively, plastics microbeads of 5 µm to 1 mm or pelletised plastics in the range 1 mm to 10 mm are used.

In another aspect of this invention, the mixed plastics, bitumen and aggregate of step 2 is used to form a road surface.

Advantageously, the road surface is made by laying the material of step 2 at a temperature in the range of 70° C.-160° C. and subsequently rolling the material so that it is compacted, the rolling weight being up to approximately 10,160 kg (10 ton).

It will, therefore, be understood that plastics melted with hot bitumen forms an oily coat which is provided over aggregate and the resulting mixture of a compound is laid onto a road surface. Such a technology provides improved strength of road surface having improved impermeability. When waste plastics are utilised, benefits to the environment are also forthcoming. In underdeveloped countries, employment is provided for people to pick the plastics from rubbish dumps, although in more developed countries it is envisaged that plastics-collecting machinery will be utilised.

The invention will now be described, by way of example, with reference to the accompanying drawing, in which:

FIG. 1 shows a flow chart of a method of producing a road making material and to a road made therefrom.

This invention preferably uses waste plastics that is collected from landfill sites, dumps, garbage trucks, school collection programmes, or by purchase from waste buyers/collectors, although it is to be understood that the improved road making material of this invention is not dependent upon the use of waste plastics since it is possible that plastics material from a chemical plant may be utilised.

Referring to FIG. 1, in step 1 waste plastics material is collected from the forementioned landfill sites, etc. The collected waste plastics is sorted, if required, and cleaned by, for example, washing and cut to a size of 1 mm-55 mm using a shredding machine in step 2. Alternatively, plastics microbeads of 5 μm to 1 mm or pelletised plastics in the range 1 mm to 10 mm are used.

The shredded plastics is then heated in step 3 to a temperature of 120° C.-180° C., preferably 165° C. It has been found that the plastics softens at 120° C. and there is no gas evolution in the range 120° C.-180° C. The bitumen is similarly heated, usually in a separate furnace up to 160° C. in step 3.

In step 4, the plastics are mixed with the bitumen at a rate of 5%-25% by weight of plastics to the weight of bitumen. A mixing plant is used to control the temperature of the plastics and bitumen which are mixed together so as to provide a substantially uniform coating of plastics on the bitumen.

The bitumen used may have grades 60/70, 80/100 or 100/150, but for heavily trafficked roads is, preferably, 40/60 grade.

In step 5, the heated plastics/bitumen mixture is mixed with aggregate where the plastics/bitumen mix is 4%-10% by weight to aggregate. The aggregate is typically 1-55 mm, preferably 10 mm or 14 mm and has stone dust and lime as a filler. The aggregate may, preferably, be granite stone or may be ceramics or other suitable material. The plastics/bitumen, when mixed with the aggregate, produces a bituminous compound which is aggregate coated with plastics/bitumen and the compound may be transported to a laying machine where it is laid on a pre-prepared surface, the road laying temperature being between 70° C.-160° C. in step 6. The surface is then rolled by a roller having up to an 10,160 kg (10-ton) capacity, for example.

Alternatively, steps 4 and 5 are combined in step 7 where the heated plastics and bitumen are mixed with aggregate whereby the plastics and bitumen mixture coats the aggregate.

It is believed that using plastics with bitumen to coat aggregate for a road making material has the following advantages over currently produced bitumised road surfaces:

1. A stronger road with increased Marshall stability value—road strength increased by approximately 100%, leading to maintenance intervals being doubled. It is estimated that using this invention will produce a road that will last up to ten years before maintenance is required, and may even last four or five times longer.
2. Improved resistance towards rain water penetration and water stagnation.
3. Reduced stripping and production of potholes.
4. Increased binding and improved bonding of the mix.
5. Reduced pores in aggregate with consequential reduction in rutting and ravelling.
6. No leaching of plastics.
7. Improved UV protection.
8. Increased load withstanding, thereby satisfying present day needs with heavier road vehicles and increased vehicle density.
9. Decrease in cost of road construction.
10. Useful utilisation of waste plastics
11. When using pellets or microbeads, the particle size is completely uniform meaning that the mixing time after the pellets are added is consistent and can be minimised to increase the efficiency of the asphalt plant. Producing microbeads and pelletising requires consistency of the ingredients in order to work and as such quality control is entrained into the production of the microbeads or pellets, further increasing the efficiency of asphalt plants and minimising any contamination of the down stream product. This is because the formation of a microbead or pellet is only possible if there is no contamination as any contaminants tend to block the filters in the pelletising machines.

Many variations are possible without departing from the scope of the present invention as defined in the appended claims.

The invention claimed is:

1. A method of producing a road making material comprising the steps of:
   1. heating plastics and bitumen; and
   2. mixing the heated plastics and bitumen with aggregate to form a plastics/bitumen/aggregate mixture;
   wherein the plastics/bitumen/aggregate mixture of step 2 is used to form a road surface, and
   wherein the road surface is formed by laying the material of step 2 at a temperature in the range of 70° C. to 160° C. and subsequently rolling the material so that it is compacted, wherein a rolling weight is up to approximately 10,160 kg (10 ton).

2. The method as claimed in claim 1, wherein step 2 includes the steps of:
   (a) mixing the heated plastics and bitumen to form a plastics/bitumen mixture, and
   (b) mixing the mixture of step (a) with aggregate to coat said aggregate with plastics/bitumen.

3. The method as claimed in claim 1, wherein in step 1, the plastics is heated to between 120° C.-180° C.

4. The method as claimed in claim 1, wherein the plastics is heated to approximately 165° C. and the bitumen is heated up to approximately 160° C.

5. The method as claimed in claim 1, wherein in step 1, a ratio of plastics to bitumen is 5%-25% by weight of plastics to bitumen.

6. The method as claimed in claim 1, wherein a grade of bitumen is one of 40/60, 60/70, 80/100 or 100/150.

7. The method as claimed in claim 1, wherein a grade of bitumen is 40/60 for a heavily trafficked road.

8. The method as claimed in claim 1, wherein the aggregate has a mesh size in the range 1 mm-55 mm.

9. The method as claimed in claim 1, wherein the aggregate has a mesh size of 10 mm or 14 mm.

10. The method as claimed in claim 2, wherein, in step (b), a ratio of the plastics/bitumen mixture to the aggregate is approximately 4%-10% by weight.

11. The method as claimed in claim 1, wherein, in step 1, waste plastics is collected, cleaned and shredded to 1 mm-50 mm to be heated and mixed with bitumen.

12. The method as claimed in claim 1, wherein plastics microbeads of 5 μm to 1 mm or pelletised plastics in the range 1 mm to 10 mm are used.

13. The method as claimed in claim 1, wherein, in step 2, a ratio of the heated plastics and bitumen to the aggregate is approximately 4%-10% by weight.

14. The method as claimed in claim 1, wherein the plastics/bitumen/aggregate mixture is a bitumous compound.

15. A method comprising the steps of:
  1. heating waste plastics and bitumen;
  2. mixing the heated plastics and bitumen with aggregate to form a plastics/bitumen/aggregate mixture;
  3. laying the material of step 2 at a temperature in the range of 70° C. to 160° C.; and
  4. subsequently rolling the material so that it is compacted, wherein a rolling weight is up to approximately 10,160kg (10 ton), thereby forming a road surface.

* * * * *